Louis C. Baker
Ralph J. Quaid  INVENTORS

BY
Frank C. Thilberg ATTORNEY.

Louis C. Baker
Ralph J. Quaid  INVENTORS

BY
Frank C. Hilberg  ATTORNEY.

Oct. 29, 1940.　　　L. S. BAKER ET AL　　　2,219,644
PROCESS OF NITRATING CELLULOSE
Filed Oct. 4, 1938　　　4 Sheets-Sheet 4

Louis C. Baker
Ralph J. Quaid
INVENTORS

BY Frank C. Hilberg
ATTORNEY

Patented Oct. 29, 1940

2,219,644

UNITED STATES PATENT OFFICE 2,219,644

PROCESS OF NITRATING CELLULOSE

Louis S. Baker, Milltown, and Ralph J. Quaid, South River, N. J., assignors to E. I. du Pont de Nemours & Company, Wilmington, Del., a corporation of Delaware Application October 4, 1938, Serial No. 233,158

6 Claims. (Cl. 260—220)

This invention relates to a process for nitrating cellulose and more particularly to a process for preparing cellulose nitrate which exhibits improved solubility in common cellulose nitrate lacquer solvents.

In the past few years regenerated cellulose sheeting known as "Cellophane" has become widely used as a desirable wrapper for a variety of products which either lose or absorb moisture when exposed to the atmosphere. When used specifically for this purpose, it is necessary that the regenerated cellulose sheeting be coated with a lacquer composition to render it moistureproof and properly sealed at the folded edges.

Heretofore, it has been found difficult to prepare a cellulose nitrate moistureproof lacquer which, when applied to regenerated cellulose sheeting for moistureproofing and heat sealing purposes, would provide suitable working properties and satisfactory clarity. Conventional methods of nitration for the production of cellulose nitrates of between about 11.0% and 11.8% nitrogen content have yielded products possessing satisfactory moistureproofing and heat sealing properties, but of poor clarity and solubility when dissolved in common lacquer solvents.

In preparing cellulose nitrates for the manufacture of lacquers for coating highly transparent regenerated cellulose sheeting such as "Cellophane," clarity and substantially complete solution of the cellulose nitrate are essential. If a heat sealing coating is required it is preferred to utilize a cellulose nitrate of about 11.0% nitrogen content and not more than about 11.5% nitrogen. If heat sealing properties are not required, it is preferred to employ a cellulose nitrate of about 11.6% nitrogen content and not more than about 11.8% nitrogen content. If a lacquer containing cellulose nitrate of about 12.0% nitrogen content is used to coat regenerated cellulose sheeting considerable "sloughing" or peeling away of the coating from the sheeting base is encountered. The present invention, therefore, is concerned with the preparation of cellulose nitrates of nitrogen contents between about 11.0% and 11.8%, by selective control of nitrating conditions whereby a nitrated product is obtained which exhibits outstanding improvements with respect to solubility in ordinary lacquer solvents and when applied to a transparent or semi-transparent base such as "Cellophane" or glassine paper affords an exceptionally clear film.

This invention has as an object the provision of a process for preparing cellulose nitrates of between about 11.0% and 11.8% nitrogen content which are substantially completely soluble in conventional cellulose nitrate solvent-diluent vehicles, for example, ethyl acetate, ethyl alcohol and toluene, combined in suitable proportions. Another object is the provision of a method of nitrating cotton linters which provides cellulose nitrates of between about 11.0% and 11.8% nitrogen contents which can be readily filtered.

A further object of this invention is the provision of a process for nitrating cellulose which yields cellulose nitrates of between about 11.0% and 11.8% nitrogen content, the solutions of which in conventional cellulose nitrate solvent-diluent vehicles are exceptionally clear and brilliant. A still further object is the provision of a process for nitrating cellulose which yields cellulose nitrate of between about 11.0% and 11.8% nitrogen content in which the cellulose is very uniformly nitrated. Other objects will appear as the description of the invention proceeds.

In the drawings all of the figures are graphs. Figure 1 shows a curve obtained by plotting filtration yield against the percentage of nitric acid in the nitrating acid mixture where the nitrocellulose has a nitrogen content of 11.0%.

The above objects are accomplished according to the present invention by controlling within definite limits the percentage of nitric acid in the nitrating acid mixture, the water content of the nitrating mixture, the time of nitration and the temperature at which the nitration is carried out.

Figure 1:
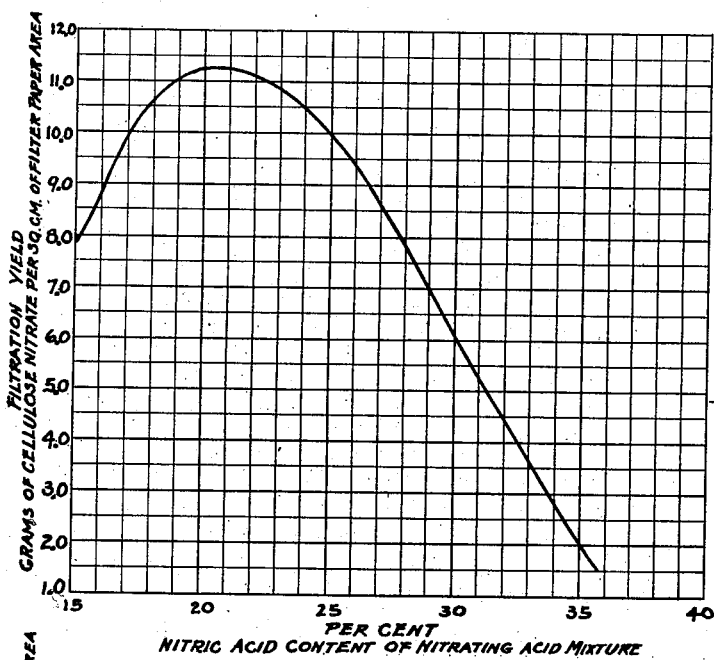

In preparing a cellulose nitrate of 11.0% nitrogen content which represents a product suitable for the manufacture of a moistureproof, heat sealing lacquer for coating cellulosic bases such as regenerated cellulose sheeting and glassine paper, the percentage of nitric acid in the nitrating mixture is adjusted to about 20.0%. The most satisfactory nitric acid range has been found to be from 18.5% to 22.5% as is indicated by the curve of Figure 1 in the attached drawing in which the arbitrary filtration yield described later is plotted against per cent nitric acid in the nitrating mixture. If nitrating acids of a lower or higher percentage of nitric acid are used to produce cellulose nitrate of 11.0% nitrogen content, the solubility of the resulting product in conventional cellulose nitrate solvent-diluent mixtures, is greatly reduced, thus proportionally impairing the clarity of the solution and final film.

The water content of the nitrating mixture is important, and should be so controlled in relation to the proportions of nitric and sulfuric acids utilized as to give a product of the desired nitrogen content, preferably between 21.0% and 22.0% of water with the nitric acid content range as indicated in the preceding paragraph, the remaining percentage being represented by sulfuric acid. It is to be understood that the ratio of combined acid to water is more critical than the ratio of nitric acid to the sulfuric acid.

Figure 2:
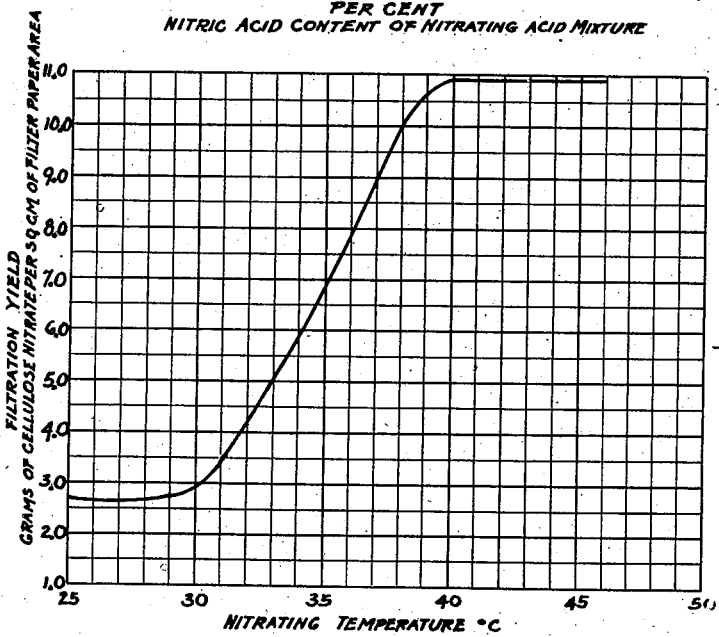
Figure 2 is a similar curve in which filtration yield is plotted against nitrating temperature in degrees centigrade.
Figure 3:
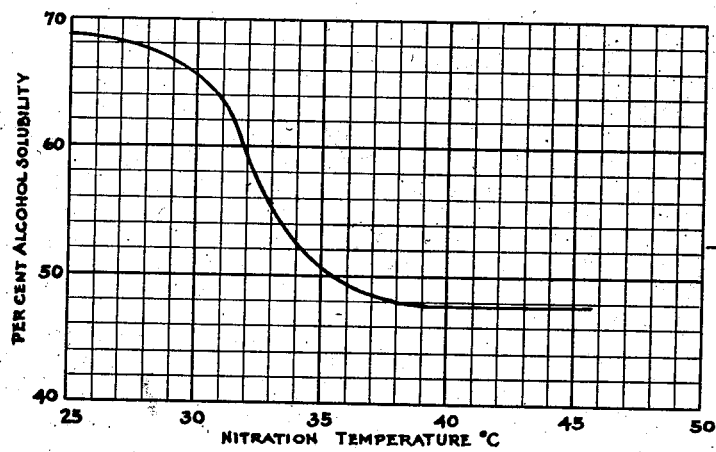
Figure 3 shows percentage of cellulose nitrate soluble in alcohol plotted against nitration temperature in degrees centigrade.

The effect of variations in nitrating temperature upon the solubility characteristics of 11.0% nitrogen cellulose nitrate is illustrated by the curves of Figures 2 and 3 in the attached drawings.

Examination of Figure 2 in which the filtration yield is plotted against the nitrating temperature, will indicate a gradual increase in quality of the nitrated product up to a 40° C. nitrating temperature. According to the curve the quality of the resulting product remains the same above 40° C. However, it would not be economical to operate at temperatures higher than 40° C. since it has been found that the nitration yield drops off rapidly above this temperature with the particular nitrating acid compositions described above.

The process of the present invention is characterized by the provision of a product that is unusually uniformly nitrated. It is well known in the art that the lower the nitrogen content of the cellulose nitrate within prescribed limits of about 10.0% nitrogen content, the greater the solubility in ethyl alcohol. For example, a cellulose nitrate which analyzes a 10% nitrogen content will exhibit practically 100% solubility in a 95% ethyl alcohol, whereas a 12% nitrogen cellulose nitrate shows only about 5% solubility. Commercial cellulose nitrate consists of a composite of cellulose nitrates of varying nitrogen contents and the customary nitrogen content designation of such products actually represents an analysis characterization in which the figure thus obtained is an average of the composite cellulose nitrates of varying nitrogen contents. Therefore, it may be concluded that the lower the alcohol solubility of 11.0% to 11.8% nitrogen cellulose nitrate for any selected set of nitrating conditions, the more uniform will be the nitration with smaller fractions of cellulose nitrates of nitrogen contents differing from the desired nitrogen content being present in the product. Figure 3 illustrates the effect of nitrating temperature on alcohol solubility of 11% nitrogen content cellulose nitrate and shows that a nitrating temperature of 40° C. produces minimum alcohol solubility.

Figure 4:
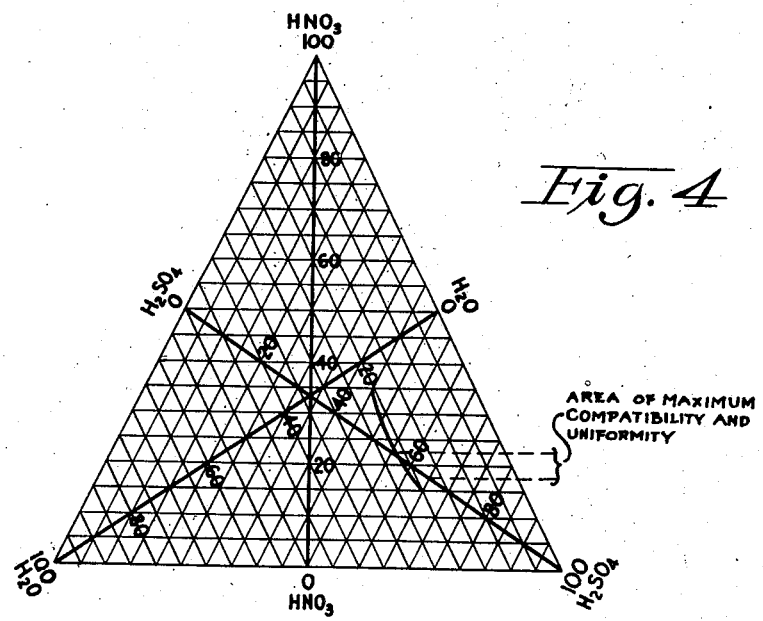
Figure 4 is a triangular graph in which the percentage of sulphuric acid, nitric acid, and water are plotted along the media of the equilateral triangle and shows the area of maximum compatibility and uniformity with respect to a constant 11% nitrogen line.

Figure 4 consists of an acid composition chart showing the relation between the nitric acid, sulfuric acid and water content for 11.0% nitrogen cellulose nitrate prior to viscosity reduction, and the area in which the maximum compatibility and uniformity of the product is obtained.

In carrying out the invention, it is preferred to nitrate the cellulose in the ratio of about 50 parts by weight of nitrating acid to about 1 part by weight of cellulose. This limitation, however, is not as critical as those mentioned above. It is also preferred to allow the acid to react with the cellulose for about 20 minutes.

The following examples illustrate the preferred embodiment of the invention although it will be understood that modifications will occur to those skilled in the art without departing from the spirit and scope thereof.

*Example 1*

One hundred and twenty grams of purified cotton linters containing 1.0% water, with a cuprammonium viscosity of 33 seconds (linters of cuprammonium viscosity of between 16 and 40 seconds are satisfactory) based on 2½ grams per 100 c. c. of cuprammonium solution were immersed in 6,000 grams of a nitrating acid mixture having the following composition:

| | Percent |
|---|---|
| Nitric acid | 19.9 |
| Sulfuric acid | 59.1 |
| Water | 21.0 |

The mixture was agitated for 20 minutes at a temperature of 40° C. The reaction was carried out in a mechanical dipping pot of the type well known in the industry. After the dipping operation, the excess acid was removed by centrifuging and the cellulose nitrate stabilized by boiling in acidulated water (0.5% as $H_2SO_4$) and then washed until acid-free in the usual manner. The cellulose nitrate so prepared had a nitrogen content of 11.08%. The viscosity characteristic of the product at this stage was 400 seconds. In order to secure maximum compatibility characteristics in the lacquer solvent-diluent mixture, the viscosity characteristic of the product was reduced to 8 seconds. A reduction to from 6 to 15 seconds viscosity characteristic gives equally satisfactory results. This was accomplished by the ammonia reduction method described in U. S. Patent No. 2,039,381, issued to Bacon, although equivalent results may also be obtained by the well-known pressure reduction method. The viscosity characteristic of the cellulose nitrate is determined according to A. S. T. M. specifications, D–301–33, formula A. The reduction in viscosity characteristic reduced the nitrogen content of the product .06% to a final value of 11.02%. The "filtration yield" of the final product determined in accordance with an arbitrary method hereinafter fully described was 11.2 grams per square centimeter of filter paper.

The method of determining cuprammonium viscosity is that described in the Analytical Edition of Industrial & Engineering Chemistry 1, pages 49–51 (1929).

The degree of solubility was determined by a "filtration yield" method. This was carried out by preparing a dispersion of 18 parts by weight of cellulose nitrate in a solvent-diluent mixture consisting of 12 parts by weight of ethyl alcohol, 24 parts of toluene, and 46 parts of ethyl acetate. This solution is filtered through filter paper under a pressure of 50 lbs. per sq. in. until there is no further exudation of the solution and the result expressed in grams of exuded bone dry cellulose nitrate per sq. cm. of filter paper area. The apparatus in which this test is carried out consists of a filtration tube which is made from a brass cylinder 10 inches long having an inside diameter of 1⅜ inches. It is provided with threaded brass caps and operates in a vertical position. The bottom cap is perforated and holds a round piece of felt approximately ⅛ of an inch thick. A Carl Schleicher 520-B filter paper was placed on top of the felt and the felt and paper held in place by a metal ring giving a filter surface area of 4.9 sq. cm. This assembly was then placed over the bottom end of the tube and screwed up tightly. The tube was filled with the solution to be tested and air pressure which is held at 50 lbs. per sq. in. by an automatic regulator applied to the space above the solution. This pressure was applied until the flow of material through the filter stops. The amount of filtrate per square centimeter of filtering area is then determined. A cellulose nitrate of the type illustrated by Example 1, which yields a filtrate containing more than 10.0 grams of bone dry cellulose nitrate per square centimeter in this apparatus is considered very satisfactory.

Figure 5:
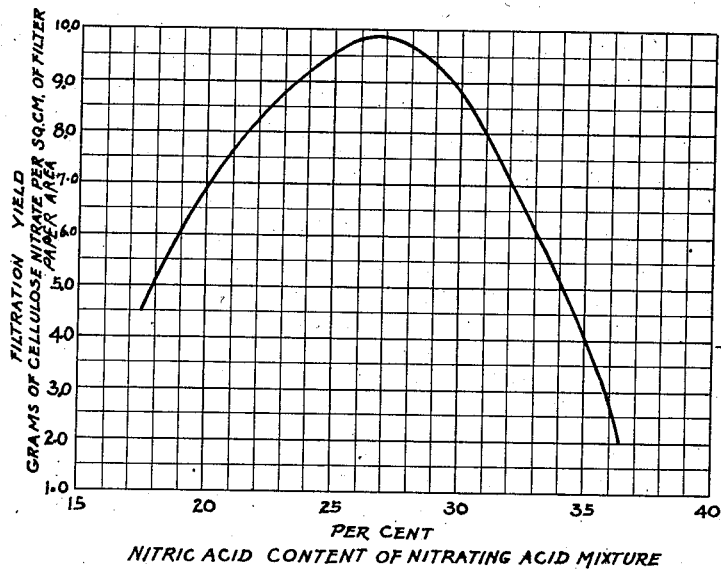
Figure 5 is a curve obtained by plotting filtration yield against percentage of nitric acid in the nitrating acid mixture in the case of a nitrocellulose having 11.6% nitrogen instead of 11.0% as shown in Figure 1.

In preparing cellulose nitrate with nitrogen content of about 11.6% the percentage of nitric acid in the nitrating mixture is adjusted to about 27.5%. The most satisfactory nitric acid range for preparing cellulose nitrates of between 11.6% and 11.8% nitrogen content has been found to be from 25.0% to 29.0% as is indicated by the curve of Figure 5 in the attached drawings in which the arbitrary "filtration yield" is plotted against per cent nitric acid in the nitrating mixture. If nitrating acids of a lower or higher percentage of nitric acid are used, the solubility of the resulting product in conventional coating lacquer solvents is greatly reduced.

The water content of the nitrating mixture is important, and should be so controlled in relation to the proportions of acids utilized as to give a product of the desired nitrogen content, preferably between 20.0% and 21.0% of water with the nitric acid content range in the nitrating acid mixture indicated in the preceding paragraph.

Figure 6:
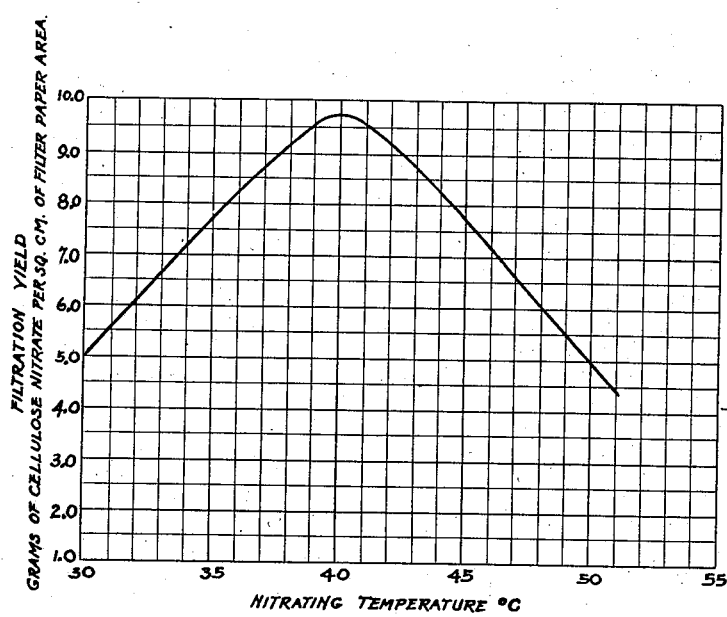
Figure 6 is a curve similar to Figure 2 except that the nitrocellulose has a nitrogen content of 11.6% instead of 11.0%.

The effect of variations in nitrating temperature upon the desired solubility characteristics of 11.6% nitrogen cellulose nitrate is illustrated by the curve of Figure 6.

Examination of Figure 6 in which the arbitrary "filtration yield" is plotted against the nitrating temperature, will indicate a gradual increase in quality of the nitrated product up to a 40° C. nitration temperature. Above 40° C. the quality and nitration yield of the resulting product decrease rapidly.

It has been found that the time of nitration reaches an optimum point at about 20 minutes, after which a decided decrease in solubility of the nitrated product as measured by the filtration yield is encountered.

Figure 7:
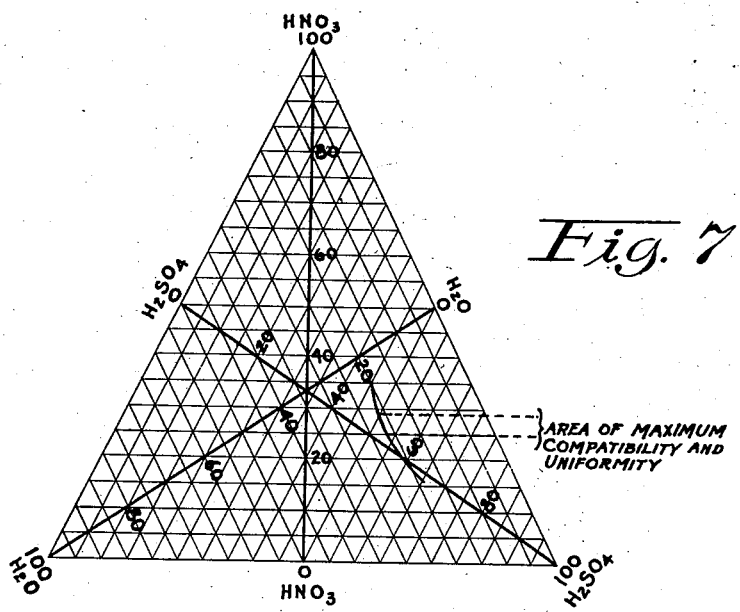
Figure 7 is similar to Figure 4 except that it relates to nitrocellulose having a nitrogen content of 11.6% instead of 11.0%.

Figure 7 represents an acid composition chart showing the relation between the nitric acid, sulfuric acid and water content for 11.75% nitrogen cellulose nitrate prior to viscosity reduction, and the area in which the maximum compatibility and uniformity of the product is obtained.

*Example 2*

One hundred and twenty grams of purified cotton linters containing 1.0% moisture with a cuprammonium viscosity of 33 seconds (based on 2½ grams per 100 c. c. of cuprammonium solution) were immersed in 6,000 grams of a nitrating acid mixture having the following composition:

| | Per cent |
|---|---|
| Nitric acid | 27.5 |
| Sulfuric acid | 52.2 |
| Water | 20.3 |

The mixture was agitated thoroughly in a mechanical dipping pot of the type well known in the industry for a period of 20 minutes at a temperature of 40° C. At the completion of the nitration, the excess acid was removed by centrifuging and the cellulose nitrate stabilized by boiling in acidulated water and then washed until acid-free in the usual manner. The cellulose nitrate had a nitrogen content of 11.75%. The viscosity of the product at this stage was 900 seconds. In order to secure maximum compatibility characteristics in lacquer solvent mixtures, the viscosity of the product was reduced to 8 seconds, according to the procedure indicated for Example 1. The treatment for reducing the viscosity characteristic reduces the analyzed nitrogen content to a value of 11.63%.

Figure 8:
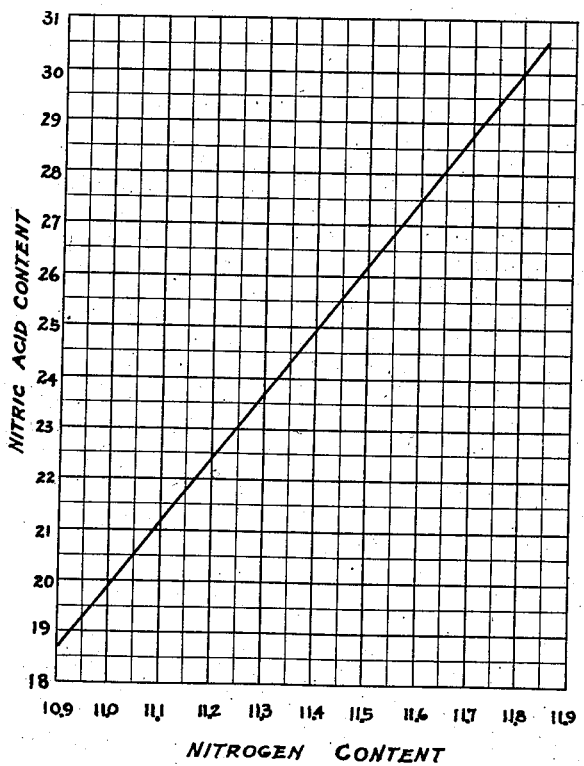
Figure 8 is a graph showing the relation of nitric acid content of the nitrating acid to the nitrogen content of the nitrocellulose which has a maximum solubility in ordinary lacquer solvents.

The degree of solubility was determined by the "filtration yield" method previously described. This was carried out by preparing a dispersion of 17.0 parts by weight of the cellulose nitrate of Example 2 in a solvent mixture consisting of 6.3 parts by weight of isopropyl alcohol, 31.6 parts of toluene, and 45.1 parts of ethyl acetate. This solution was filtered through the filter paper under a pressure of about 50 lbs. per sq. in., and the result expressed in grams of exuded bone dry cellulose nitrate per square centimeter of filter paper area. A cellulose nitrate of the type illustrated by Example 2, which yields a filtrate containing more than 9 grams of bone dry cellulose nitrate per square centimeter is considered very satisfactory Figure 8 indicates the optimum nitric acid content of the nitrating acid mixtures for preparing cellulose nitrate of any desired nitrogen content between 10.9% and 11.85% when the temperature and time of nitration are held constant at 40° C. and 20 minutes respectively. Slight variations in the water content of the nitrating acid mixture for preparing any specific nitrogen content cellulose nitrate within the range indicated may be readily determined by those skilled in the art.

Cellulose nitrate prepared according to this invention, in addition to being completely soluble in coating lacquer solvents, offers the advantage that it is exceptionally free from unnitrated fibers which results in a solution of exceptional clarity, brilliance, and freedom from haze. Furthermore, the improved product prepared according to this invention is completely soluble at higher concentrations (for example, 18%) in conventional lacquer solvent-diluent mixtures, which affords desirable economies as compared to products previously available. Another advantage from an economical standpoint is that the customary filtration step of conventional processes may usually be eliminated. The invention also presents the advantage that coatings of superior brilliance and clarity are produced when applied to regenerated cellulose sheeting for moisture-proof and heat-sealing purposes. Lacquers prepared from the products of this invention are of considerable merit in coating paper, particularly glassine type papers. They are also useful in general finishing of objects where the aforementioned properties are needed.

The previously described solvent-diluent compositions are, of course, merely illustrative of the large number of such mixtures well known and widely used in the art and many diverse combinations of such character of substantially equivalent solvency may be employed in preparing acceptable solutions from the cellulose nitrate of the present invention. Suitable solvents and diluents include esters of the lower fatty acids; for example, ethyl acetate, butyl acetate, amyl acetate, isobutyl acetate, butyl propionate and the like, ketones such as methyl ethyl ketone, alcohol ethers and their esters such as ethylene glycol mono-ethyl ether and ethylene glycol mono-methyl ether acetate, lower aliphatic alcohols and aliphatic and aromatic hydrocarbons such as petroleum naphtha and toluene.

The very desirable results of the present invention may be obtained with cellulose nitrates of nitrogen contents between about 10.8 and 11.8%, when prepared according to the process limitations indicated above and afford improved moisture-proofing and heat sealing lacquer coatings for "Cellophane" and other similar surfaces such as glassine paper.

It is apparent that many widely different embodiments of this invention may be made without departing from the spirit and scope thereof; and, therefore, it is not intended to be limited except as indicated in the appended claims.

We claim:

1. In the process of preparing cellulose nitrate from purified cotton linters of improved solubility characteristics in lacquer solvents and which has a nitrogen content between approximately 10.8% and 11.8%, the improvement which comprises nitrating cellulose at a temperature of about 40° C. with a nitrating acid mixture containing between 18.5% and 29.0% nitric acid and between 20 and 22% water for about twenty minutes.

2. Process of claim 1 in which the ratio between the nitrating acid mixture and the cellulose is approximately 50 to 1.

3. Process of claim 1 in which the cellulose nitrate viscosity characteristic is reduced to from 6 to 15 seconds.

4. In the process of preparing nitrocellulose having a nitrogen content of about 11.0%, the improvement which comprises nitrating purified cotton linters having a cuprammonium viscosity of at least 16 seconds with a nitrating acid mixture containing about 20% nitric acid at a temperature of 40° C. for about twenty minutes.

5. In the process of preparing nitrocellulose having a nitrogen content of about 11.6%, the improvement which comprises nitrating purified cotton linters having a cuprammonium viscosity of at least 16 seconds with a nitrating acid mixture containing about 27% nitric acid at a temperature of about 40° C. for about twenty minutes.

6. In the process of preparing cellulose nitrate having a nitrogen content between 10.8% and 11.8%, the improvement which comprises nitrating purified cotton linters having a cuprammonium viscosity of at least 16 seconds with an acid mixture containing about 18.5% to 29.0% nitric acid, 20.0% to 22.0% water and the remainder of sulfuric acid adjusting the ratio of nitrating acid mixture to cotton linters to about 50 parts by weight of acid to 1 part by weight of linters, heating to about 40° C. for twenty minutes and removing the nitrating mixture from the nitrated linters.

LOUIS S. BAKER.
RALPH J. QUAID.